United States Patent Office 3,309,331
Patented Mar. 14, 1967

3,309,331
FREEZE-THAW STABLE AQUEOUS PAINTS CONTAINING CARBOXYL, AMINOESTER AND HYDROXYAMIDE RADICALS
Maurice J. McDowell, Media, Pa., and Trevor B. Hill, Williamsburg, Va., assignors to E. I. du Pont de Nemours and Company, Wilmington, Del., a corporation of Delaware
No Drawing. Filed Nov. 4, 1965, Ser. No. 506,413
6 Claims. (Cl. 260—29.6)

This invention concerns a novel aqueous dispersion useful for formulating coating compositions. In particular, this invention relates to an aqueous dispersion of a polymer which has a balance of properties that are essential to its utilization as a film-forming material in durable paint compositions designed for all types of exposure. More particularly, this invention concerns a latex of a negatively charged water-insoluble vinyl addition polymer having pendent carboxyl groups and monovalent radicals attached to the carbon atoms of the polymer backbone. The latex is stable under conditions of freezing and thawing, air dries to a continuous coating, and has excellent wet and dry adhesion to a variety of substrates.

This application is a continuation-in-part of the copending application Ser. No. 410,765, filed Nov. 12, 1964, and now abandoned.

The term "latex" designates an aqueous dispersion of a water-insoluble polymer which is present in the form of very fine particles.

An application by Simms, Ser. No. 379,718, filed July 1, 1964, shows a novel "iminated latex" which is formulated by reacting a carboxylic polymer latex with an aziridine compound. However, these iminated latices formulated by Simms are not sufficiently freeze-thaw stable to be useful in paints and do not have the necessary balance of properties which allow pigmentation which is necessary in paint compositions without coagulating the polymer.

"Carboxylic polymer" designates a substantially water-insoluble interpolymer containing pendent carboxyl groups (—COOH) or their salts (e.g., —COONH$_4$). This interpolymer is the product of at least one monomer containing both polymerizable olefinic unsaturation and a carboxylic acid group (or an equivalent source of carboxyl groups) with at least one other monomer which is copolymerizable therewith.

Latices of the unique polymer of this invention have excellent freeze-thaw stability, can be readily pigmented to form paint compositions without polymer coagulation, and have excellent adhesion to all types of substrates even when containing large concentrations of nonionic surfactants which are often necessary to disperse pigments in paint compositions. Films formed by the polymer of this invention are extremely durable to weathering and have excellent flex and crack resistance. Also, paints utilizing the polymers of this invention have excellent tint retention, chalk resistance and cleanliness retention. These highly advantageous properties of the polymer of this invention are attributed to the particular balance of constituents in the polymer chain, i.e., the polymer has sufficient acid content to give an overall negative charge to the polymer which actually anionically stabilizes the polymer latex and the polymer has pendent monovalent groups attached to the backbone of the polymer which provide desirable properties, such as excellent wet adhesion.

The novel product of this invention is a freeze-thaw stable film-forming composition of an aqueous dispersion of a water-insoluble negatively charged carboxylic vinyl addition polymer having monomer units of $C_2$ to $C_{20}$ carbon atoms. This vinyl addition polymer contains about 0.3–5% by weight of α,β-unsaturated monovinylidene carboxylic acid units, but preferably contains 1.5 to 3% by weight of acid units. In any event, sufficient anionic carboxylic acid radicals (i.e., —COO⁻ groups) must be present to impart to the polymer an overall negative charge.

The vinyl addition polymer has attached to the carbon atoms of the polymer backbone pendent monovalent radicals which are either aminoester radicals or hydroxyamide radicals or a mixture of aminoester and hydroxyamide radicals. The pendent aminoester radical has the formula

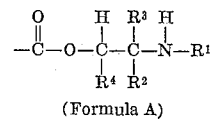

(Formula A)

and the hydroxyamide radical has the formula

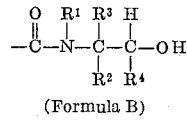

(Formula B)

In the above formulas, $R^1$ is H, benzyl or a $C_1$–$C_5$ alkyl radical. $R^2$ and $R^3$ are selected individually from the group consisting of H, benzyl, aryl and a $C_1$–$C_5$ alkyl radical. $R^4$ is H or a $C_1$–$C_5$ alkyl radical. Preferably, $R^1$, $R^3$ and $R^4$ are hydrogen and $R^2$ is from the group of hydrogen and methyl.

The monovalent pendent radicals constitute about 0.03–3% of the weight of the vinyl addition polymer, but preferably, the radicals constitute about 0.1–1% by weight of the polymer.

The novel aqueous dispersion of this invention has a pH between 7 and 10, but preferably, a pH between 8 and 10. The dispersion also contains about 0.3 to 10%, based on the weight of the polymer, of a nonionic surfactant and preferably contains about 1–6% by weight of the nonionic surfactant.

To form the novel product of the invention, a carboxylic polymer having monomer units containing 2 to 20 carbon atoms in the latex form is reacted with an aziridine compound. The reaction between the aziridine compound, which is often referred to as an alkylene imine, and the carboxyl groups of the carboxylic polymer is herein referred to as an "imination reaction." The carboxylic polymer latex after it has been subjected to the imination reaction is referred to as an "iminated latex."

Preferably, the novel product of this invention is formed by reacting the aziridine compound with a carboxylic polymer latex having an acidic pH. Under these conditions, pendent aminoester radicals are formed by the reaction of the aziridine compound with the —COOH groups of the polymer. To stabilize the iminated latex, the pH of the latex is adjusted to an alkaline pH of about 8–10 with a suitable base, such as ammonia. Rearrangement of the pendent aminoester radicals to hydroxyamide radicals often occurs under these alkaline conditions until equilibrium is reached which gives a product having both pendent aminoester radicals and hydroxyamide radicals. However, by using other reaction conditions, it is quite possible to form a polymer having all pendent hydroxyamide radicals or by keeping the above iminated latex at an acidic pH, it is possible to retain all of the pendent groups in the aminoester form.

The aziridine compounds used in this invention have the following formula:

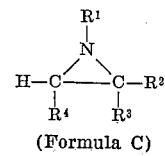

(Formula C)

wherein $R^1$, $R^2$, $R^3$ and $R^4$ are as defined in Formula A.

Ethylenimine (Formula D) and 1,2-propylenimine (Formula E) as shown hereinafter are particularly preferred aziridines useful in this invention because of their relatively low cost and plentiful supply and because they tend to provide the final product with excellent adhesive properties.

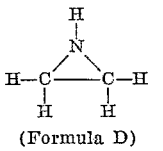
(Formula D)

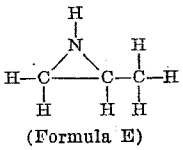
(Formula E)

It is quite unexpected and surprising that the aziridine compound reacts effectively and efficiently with a carboxylic polymer latex since it is well known that aziridines are susceptible to hydrolysis and polymerization in an aqueous media. It is recognized that a portion of the aziridine compound does hydrolyse and polymerize during the imination reaction and that the resulting iminated latex contains these by-products such as the aminoalcohol from the aziridine compound and a polymer from the aziridine compound.

The carboxylic polymer latex that is subsequently reacted with an aziridine compound to form the novel latex of this invention is prepared by known methods of emulsion polymerization in which a carboxylic acid monomer is reacted in an aqueous medium with copolymerizable monomers that are not carboxylic acids. A wide variety of $\alpha,\beta$-unsaturated monovinylidene carboxylic acids can be used to provide carboxyl units to the polymer. Methacrylic acid, acrylic acid, crotonic acid and itaconic acid are the more practical species. For example, when the copolymer consists of units of acrylic acid esters and methacrylic acid esters, methacrylic acid is preferred; when styrene containing copolymers are used, maleic anhydride is preferred; with vinyl acetate copolymers, crotonic acid is preferred.

A variety of copolymerizable monomers having $C_2$ to $C_{20}$ carbon atoms and preferably $C_2$ to $C_{12}$ carbon atoms form useful carboxylic polymers when reacted with the aforementioned alpha, beta-unsaturated carboxylic acids. The following copolymerizable compounds, for example, form particularly useful coating compositions: alkyl esters of acrylic and methacrylic acid in which the alkyl group contains 1 to 12 carbon atoms, conjugated dienes having 4–10 carbon atoms, such as butadiene, olefins, such as ethylene, acrylonitrile, styrene, alkyl-substituted styrene, vinyl acetate, dibutyl maleate, or blends of two or more of these compounds.

Carboxylic polymers having the following monomeric constituents are particularly useful in this invention: methacrylic acid/methacrylic acid ester of a $C_1$–$C_4$ saturated aliphatic monohydric alcohol; methacrylic acid/acrylonitrile/butyl acrylate; methacrylic acid/styrene/butyl acrylate; methacrylic acid/styrene/butadiene; methacrylic acid/ethylene; methacrylic acid/dibutyl maleate/vinyl acetate; and methacrylic acid/vinyl acetate/acrylic acid ester of $C_1$–$C_8$ saturated aliphatic monohydric primary alcohol.

This invention also encompasses iminated latices which are used in outdoor paints to protect primarily wood substrates. The polymer for this particular use must have physical properties which will withstand the conditions of expansion and contraction of the wood substrate under wide ranges of climatic conditions. For this purpose, the carboxylic polymer is at least ternary in composition and contains about 0.3 to 5% by weight of (A) alpha, beta-unsaturated monovinylidene carboxylic acid units, but preferably contains about 1.5 to 3% by weight of acid units; the remainder of the interpolymer contains a mixture of alpha, beta-unsaturated monovinylidene estres of (B) methacrylic acid and (C) at least one acrylic acid ester of a $C_2$–$C_8$ saturated monohydric primary alcohol. Preferred $C_2$–$C_8$ alcohols include ethanol and butanol, 2-ethylhexanol, octanol-1, isobutanol, hexanol-1 and pentanol-1. Particularly preferred acrylic acid esters are ethyl acrylate and 2-ethylhexyl acrylate.

Typical of the known methods of making a carboxylic polymer latex useful in the practice of this invention are those described in U.S. Patents 2,395,017, 2,724,707, 2,787,603, 2,868,752; 2,868,754, 2,918,391 and 3,032,521, the disclosures of which are incorporated herein by reference. Especially pertinent is the method described in U.S. 2,724,707, column 5, line 21 to column 6, line 60.

The emulsions used in preparing the carboxylic polymer latex is composed of the mixture of monomers, suitable emulsification and suspension agents (surfactants), buffering agents for pH control and a free radical catalyst; for example, potassium persulfate, a peroxide such as hydrogen peroxide, a diazo compound, such as azobisisobutyroamidine hydrochloride or a redox type, such as persulfate-sulfite, or mixtures of such catalysts. Polymerization can be carried out in the presence of a free radical catalyst in a closed vessel in an inert atmosphere and under autogenous pressure or under artificially induced pressure or in an open vessel under reflux at atmospheric pressure. The temperatures of the polymerization can be varied from 0° C. or lower to 100° C. or higher, preferably from 20° C. to 90° C., depending to a large degree upon the activity of the monomers and catalyst used and the molecular weight desired in the polymer product.

The carboxylic polymer is produced in any molecular weight that is desired; usually the molecular weight is above 100,000 for polymers used as the film forming constituent of paints but even molecular weights of about a million and above are frequently used.

In the interest of obtaining a substantially water-insoluble carboxylic polymer and a stable latex product, it is usually best to add less than 10% acid monomer based on the total weight of monomer in the reaction mixture, while insuring, in any event, that the polymer after the imination reaction contains at least 0.3% by weight of carboxylic monomer units. Thus, the iminated polymer product is characterized by having an overall negative charge imparted to it by the pendent carboxyl radicals and has attached to the carbon atoms of the polymer backbone the aforementioned monovalent radicals.

The acid content of the carboxylic polymer can be determined by separating the polymer from the aqueous phase, dissolving it in a solvent and titrating the resulting polymer solution with alcoholic KOH to a phenolphthalein end-point. The acid content can also be determined by complete chemical analysis of the polymer.

In a typical procedure for carrying out the imination reaction, the aziridine compound is mixed with the carboxylic polymer latex in a reaction vessel under atmospheric pressure. Preferably, the amount of aziridine compound added to the carboxylic polymer latex is 10–70% of the molar amount of aziridine which is necessary to react with all the pendent carboxyl groups of the carboxylic polymer, assuming 100% reaction of the aziridine compound. The mixture is stirred and reacted at about 35–90° C. until the reaction is completed. (e.g., about ½ hour at the higher temperatures to about 12 hours at the lower temperatures). Finally, the reaction product is cooled to room temperature. The upper temperature limit of the imination reaction is determined largely by how much heat the particular latex will withstand without coagulating. The entire reaction can be carried out at room temperature, but heating is much preferred because of the shorter reaction time.

After imination of the carboxylic polymer, the pH of the latex is adjusted by addition of a suitable base. Ammonia is convenient and preferable to use for this purpose but amines and alkaline materials, such as KOH and NaOH, can also be used. Morpholine can also be used since morpholine provides the latex with excellent freeze-thaw stability which is an extremely desirable characteristic for a latex which is used in a paint. When the latex is to be used in a paint composition, a pH of 9–10 is preferred and is obtained by addition of one of the aforementioned bases, such as ammonia.

The iminated latex of this invention is useful as the film forming constituent in a wide variety of coating compositions, such as outdoor and indoor house paints, concrete paints, clear finishes for wood, bowling lane finishes, clear finishes for metals, such as aluminum and chrome.

To form a pigmented coating composition from the novel iminated latex, any of the ordinary water-insoluble inorganic and organic paint pigments well known in the art can be used with the novel aminoester latex. However, the relative amount and type of pigment in the latex binder has a significant effect on the properties of the paint. A pigment volume concentration of about 10% is about the minimum proportion of pigment which will provide a paint which has a practical hiding power. The maximum proportion of pigment volume concentration is about 50%. Preferably, however, a pigment volume concentration in the range of 25–40% is desirable. Pigment volume concentration is the ratio expressed on a percent basis of the volume of pigment to the total volume of pigment plus film-forming materials of the compositions; the "volume of pigment" is the volume of vehicle displaced by the pigment wet with vehicle.

Various auxiliary agents which are normally used in latex base paints can also be added, including bodying agents, such as methyl cellulose, defoaming agents, such as tributyl phosphate or waxes, humectants, such as ethylene glycol or water-soluble gums and bactericides or fungicides, such as borax.

To keep pigments and other additives dispersed and to make the iminated latex freeze-thaw stable nonionic surfactants are used. These may be added directly to the iminated latex before the pigments and the additives are mixed with the latex or the nonionic surfactant may be a portion of the mill base or pigment dispersion which is added to the latex. Typical nonionic surfactants which may be used include alkylphenoxypolyethoxyethanols having alkyl groups of about seven to twelve carbon atoms, such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols, and the like; polyethoxyethanol derivatives of methylene linked alkyl phenols; sulfur-containing agents, such as those made by condensing the required proportion of ethylene oxide with nonyl, dodecyl, tetradecyl mercaptans or with alkylthiophenols having alkyl groups of six or fifteen carbon atoms; ethylene oxide derivatives of long-chained carboxylic acids, such as lauric, myristic, palmitic, oleic, and the like; or mixtures of acids such as found in tall oil; ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, etc. A preferred nonionic surfactant is octyl phenyl polyglycol ether. Numerous additional species of nonionic surfactants useful in this invention are listed in "Synthetic Detergents" by J. W. McCutcheon, published annually by MacNair-Dorland Company, New York.

The examples which follow are given for the purpose of illustrating the invention. All quantities shown are on a weight basis unless otherwise indicated. The water listed in the formulas is deionized water.

EXAMPLE 1

An iminated latex is prepared by first forming a latex of a carboxylic polymer having a composition of 45:53:2 methyl methacrylate:2-ethylhexyl acrylate:methacrylic acid and then reacting this carboxylic polymer latex with an alkylene imine.

Latex A

| | Parts by weight |
|---|---|
| Portion 1: Water | 618 |
| Portion 2: | |
| Methyl methacrylate | 499 |
| 2-ethylhexyl acrylate | 587 |
| Methacrylic acid | 22 |
| Anionic surfactant (30% aqueous solution of sodium lauryl sulfate) | 37 |
| Sodium metabisulfite | 1.1 |
| Water | 548 |
| Portion 3: Potassium persulfate (4% aqueous solution) | 56.2 |
| Portion 4: Same as portion 3 | 15.5 |
| Portion 5: Propylenimine | 7.2 |
| Portion 6: Ammonium hydroxide (25% aqueous solution) | 7.0 |
| Portion 7: Nonionic surfactant, 50% aqueous solution of Triton X–100 (octyl phenyl polyglycol ether) | 66 |
| Total | 2464.0 |

When necessary, the portion is premixed before it is added. Portion 1 is charged into a conventional polymerization vessel equipped with stirrer, thermometer, condenser and means to introduce nitrogen and reagents. The following polymerization reaction is carried out under an atmosphere of nitrogen. About 10% of portion 2 is added to the vessel with continuous stirring and the mixture is heated to 65° C. Portion 3 is added with stirring and then the heat source is removed. The exothermic reaction raises the temperature of the mixture to about 70° C. in about 9 minutes. The remainder of portion 2 is gradually added over a period of 65 minutes while keeping the contents of the vessel at about 72–78° C. Portion 4 is added with stirring and the reaction mixture is held at 77–82° C. for 1 hour. The reaction mixture is cooled to about 60° C. and portion 5 is added with stirring and the mixture is kept at 60° C. for 2 hours. The reaction mixture is cooled at room temperature, and portions 6 and 7 are added with continuous stirring.

The completed iminated latex A has a total solids content of 48.6%, a pH of 9.5 and a weight per gallon of 8.6 pounds.

Pigment and various modifiers are added to latex A in the form of a premixed dispersion prepared according to Formula 1.

Formula 1.—Pigment dispersion

| | Parts by weight |
|---|---|
| Portion 1: | |
| Talc pigment, extender | 2,349 |
| Methyl cellulose, "Methocel" HG | 53 |
| Portion 2: Water | 2,535 |
| Portion 3: | |
| Anti-foam agent, "Nopco" 1497V | 53 |
| Potassium tripolyphosphate | 30 |
| Ammonium hydroxide (28% aqueous solution) | 41 |
| Bodying agent, "Acrysol" A–3 | 90 |
| Phenyl mercury oleate (10% solution in mineral spirits) | 579 |
| Ethylene glycol | 285 |
| Portion 4: | |
| Titanium dioxide pigment anatase | 1,084 |
| Titanium dioxide pigment rutile | 4,848 |
| Portion 5: | |
| Water | 397 |
| Ethylene glycol | 177 |
| Portion 6: | |
| Nonionic surfactant, 50% aqueous solution Triton X–100 (octyl phenyl polyglycol ether) | 11 |
| Water | 354 |

Portion 7: Parts by weight
    Mica _____ 1,952
    Ammonium hydroxide (20% aqueous solution) _____ 41
    Anti-foam agent, "Nopco" 1497V _____ 30

Total _____ 14,909

In Formula 1, "Methocel" HG has a viscosity of 3000 to 5000 centipoise at 20° C., measured on a 2% aqueous solution. "Nopco" 1497V is understood to be composed of 60% anionic sulfated saturated fatty acid, 8% free fatty acid, and 32% inert matter. "Acrysol" A–3 is a 25% aqueous solution of low molecular weight water-soluble polyacrylic acid.

The 7 portions of Formula 1 are introduced into a mixing tank in the order shown and uniformly blended and dispersed in accordance with conventional procedure for making pigment dispersions for use in latex paints.

Next, latex paint A is prepared by uniformly blending the following components:

*Latex paint A*

Parts by weight
Formula 1 pigment dispersion _____ 149.09
Latex A _____ 142.10
Ethylene glycol _____ 1.48
Ammonium hydroxide (28% aqueous solution) _ 1.97
Water _____ 5.50

Total _____ 300.14

The resulting paint has a pigment volume concentration of 31%, a pH of about 9.7, a density of about 11.6 pounds per gallon and viscosity of about 75–82 Krebs units.

EXAMPLE 2

An iminated latex is prepared by first forming a latex of a carboxylic polymer having a composition of 28.5:69:2.5 of methyl methacrylate:ethyl acrylate:methacrylic acid and then iminating this carboxylic polymer latex with an alkylene imine.

*Latex B*

Portion 1: Parts by weight
    Nonionic surfactant (nonylphenoxy ethylene oxyethanol) _____ 94
    Water _____ 184.5
    Ferrous ammonium sulfate _____ 0.04
    Anionic surfactant (30% aqueous solution of sodium lauryl sulfate) _____ 7.87
    Water _____ 18.6
Portion 2:
    Methyl methacrylate _____ 518.1
    Ethyl acrylate _____ 1,254.4
    Methacrylic acid _____ 46.5
    Sodium bisulphite (7% aqueous solution) _____ 35
    Ammonium persulphate (13% aqueous solution) _____ 23.5
Portion 3: Ammonium persulphate (5% aqueous solution) _____ 15.26
Portion 4: Ammonium persulphate (2.7% aqueous solution) _____ 28.46
Portion 5:
    Hydrogen peroxide (35% aqueous solution) _____ 7
    Water _____ 24.5
Portion 6: Propylenimine _____ 10.2

Total _____ 2,267.93

When necessary, the portion is premixed before it is added. Portion 1 is charged into a conventional polymerization vessel equipped with stirrer, thermometer, condenser and means to introduce nitrogen and reagents. The following polymerization reaction is carried out under an atmosphere of nitrogen. Portion 1 and about 10% of portion 2 are added to the vessel with continuous stirring and the mixture is heated to 65° C. Following the addition of portion 2, the temperature of the reaction mixture is raised to 78° C. and held at this temperature for 10 minutes. About 50% of the remainder of portion 2 is added continuously over 50 minutes while maintaining the temperature of the reaction mixture at about 72–78° C. Portion 3 is added to the vessel with continuous stirring at a temperature of about 72–78° C. The remainder of portion 2 is gradually added with continuous stirring over a period of about 50 minutes while the reaction mixture is kept at a temperature of about 72–78° C. Portion 4 is added with continuous stirring and the temperature of the reaction mixture is held at 72–78° C. for 30 minutes. Portion 5 is gradually added with constant stirring and the reaction mixture is maintained at a temperature of about 72–78° C. After 1 hour, portion 6 is slowly added with constant stirring while keeping the temperature of the mixture at 72–78° C.

After 1 hour, the iminated latex is cooled to room temperature and the pH of the latex is adjusted to 9.5 with a 28% aqueous solution of ammonium hydroxide. Latex B has a total solids content of 47.3% and a weight of 8.8 pounds per gallon.

Next, latex paint B is prepared from latex B by blending the compounds as shown below:

*Latex paint B*

Parts by weight
Formula 1 pigment dispersion _____ 25.26
Latex B _____ 26.80
Ammonium hydroxide (28% aqueous solution) ___ 0.35

Total _____ 52.41

The resulting paint has a pigment volume concentration of about 30%, a pH of about 9.5, a density of about 11.3 pounds per gallon and a viscosity of about 78–83 Krebs units.

One coat of each of the above paints A and B is applied using an ordinary paint brush to the exterior walls of a house. One of the above paints is used per house and both of the houses are in the same general geographic location. Each house had been painted four years previously with a conventional oil-base primer and white topcoat. The old weathered paint film on each house is scraped lightly to remove loose paint from cracked and blistered areas, and the bare areas are primed with a conventional oil-base exterior primer and allowed to dry prior to the latex paint application. Both of the latex paints have excellent application properties on both the primed areas and the weathered film areas. The paint films are allowed to air dry and age under ordinary atmospheric conditions. The paint on each of the houses is examined at frequent intervals for a period of several months and all paints were found to have excellent resistance to cracking and blistering and good retention of appearance in general.

Loose pieces of clapboard siding in the same condition as those on the houses are painted and dried as described above with latex paints A and B. The painted pieces are immersed in water for several hours and then tested immediately for paint film adhesion and abrasion resistance by conventional methods. The paint films are found to be much more resistant to removal with pressure-sensitive adhesive tape and to damage by abrasion with a pencil eraser than carboxylic polymer paints which were not iminated but were deposited and tested in the same manner. The latter are paints which are identical to latex paints A and B, except the polymers were not iminated with an alkylene imine.

EXAMPLE 3

The following carboxylic polymer latices are prepared using constituents and a polymerization procedure similar to that used in Example 1 with the exception of the monomeric components:

| | Polymeric Component | Ratio |
|---|---|---|
| Latex C | Styrene:butyl acrylate:methacrylic acid | 56:40:4 |
| Latex D | Vinyl acetate:dibutyl maleate:methacrylic acid | 73:24:3 |
| Latex E | Vinyl acetate:2-ethylhexyl acrylate:crotonic acid | 72:24:4 |

Latices C, D and E are each iminated with about 0.3% by weight, based on the weight of the polymer, propylenimine by the procedure of Example 1. The pH of the latices is adjusted to about 8 with a 28% aqueous solution of ammonium hydroxide.

The iminated polymers have a molecular weight over a million. The latices have a polymer solids content of about 48% and a weight per gallon of about 8.6 pounds.

Next, paints are formulated from latices C, D and E by using the pigment dispersion of Example 1 and by generally following the formulation of latex paint A of Example 1.

The resulting latex paints C, D and E have a pigment volume concentration of about 30%, a density of about 11.6 pounds per gallon.

EXAMPLE 4

The following carboxylic polymer latices are prepared using constituents and a polymerization procedure similar to that used in Example 1 with the exception of the polymeric components and the polymerization equipment which is adapted in such a manner so the gaseous butadiene monomer component can be copolymerized:

| | Polymeric Component | Ratio |
|---|---|---|
| Latex F | Methyl methacrylate:butadiene:methacrylic acid | 55:40:5 |
| Latex G | Styrene:butadiene:methacrylic acid | 56:40:4 |

Latices F and G are each iminated with about 0.3% by weight, based on the weight of the polymer, propylenimine by the procedure of Example 1. The pH of the latices is adjusted to about 9 with 28% aqueous solution of ammonium hydroxide. The resulting iminated polymers have a molecular weight over a million and the latices have a polymer solids content of about 42%.

Next, paints are formulated from latices F and G by using the pigment dispersion of Example 1 and by generally following the formulation used in forming latex paint A of Example 1.

The resulting latex paints F and G have a pigment volume concentration of about 30% and a density of about 11.6 pounds per gallon.

*Testing latex paints A–G*

Latex paints A–G which are prepared with the corresponding iminated carboxylic polymer latices are subjected to the following test:

About 1 pint of each of the paints is subjected to a freeze-thaw cycle of 16 hours at −18° C. and 16 hours at about 25–26° C. After each cycle, the latices are examined for polymer coagulation. After five freeze-thaw cycles, no polymer coagulation or grit deposits of polymer were formed in any of the paints nor did a significant change in viscosity occur.

EXAMPLE 5

An iminated latex is prepared by first forming a latex of a carboxylic polymer by generally following the polymerization procedure of Example 1. The resulting carboxylic polymer latex, latex H, which has the composition of 97:3, butyl methacrylate:methacrylic acid, is then iminated with about 0.3% by weight, based on the weight of the polymer propylenimine according to the procedure of Example 1 to form latex H.

An exterior clear paint is prepared by uniformly blending the following components:

| | Parts by weight |
|---|---|
| Latex H | 100 |
| Carbitol | 5 |
| Nonionic surfactant 50% aqueous solution of Triton X-100 (octyl phenyl polyglycol ether) | 3 |
| Xylene | 10 |
| Water | 25 |
| 2,4-Dihydroxybenzophenone | 3.7 |
| Methyl cellulose, "Methocel HG" (identified in Example 1) | 0.3 |
| Ammonium hydroxide (28% aqueous solution) | 0.5 |
| Total | 147.5 |

The exterior clear paint has excellent package stability and is resistant to freezing and thawing. When the paint is applied as a coating to a wood substrate exposed to outdoors, the coating has good durability to weathering and excellent gloss retention.

EXAMPLE 6

An iminated latex is prepared by first forming a latex of a carboxylic acid polymer by following the polymerization procedure of Example I of U.S. Patent 3,069,-375. The resulting carboxylic polymer latex, latex I, which has the composition of 63:32:5, acrylonitrile:butyl acrylate:methacrylic acid and a solids content of 32%, is then iminated with 0.3% by weight, based on the weight of the polymer propylenimine according to the procedure of Example 1 to form latex I.

Latex paint I is formulated by uniformly blending the following:

| | Parts by weight |
|---|---|
| Latex I | 650 |
| Nonionic surfactant, 50% aqueous solution of Triton X–100 (octyl phenyl polyglycol ether) | 20 |
| Methyl cellulose solution (16% solids in ethylene glycol) | 21 |
| Formula 1—pigment dispersion (see Example 1) | 547 |
| Benzyl butyl phthalate | 50 |
| Diacetone alcohol | 50 |
| Ammonium hydroxide (28% aqueous solution) | 10 |
| Total | 1348 |

The resulting paint has a pigment volume concentration of about 30%, and a density of about 11 pounds per gallon. The paint has excellent freeze-thaw stability and forms a continuous protective coating when applied to metal substrates and dried at elevated temperatures.

EXAMPLE 7

An iminated latex is prepared by first forming a carboxylic polymer of 84.8:13.5:1.7, ethylene:ethyl acrylate:methacrylic acid which is emulsified into a latex, and then the carboxylic polymer is iminated with an alkylene imine.

The above polymer is formed by using a high pressure polymerization vessel which can be heated to an elevated temperature. The polymer is formed at 1430 atmospheres pressure and at 190° C. The reactants are continuously fed into the polymerization vessel at the following rates:

| | |
|---|---|
| Ethylene, lbs./hr. | 5.37 |
| Ethyl acrylate, lbs./hr. | 0.174 |
| Methacrylic acid, lbs./hr. | 0.015 |
| Benzene (used as a diluent for the monomer and the catalyst), lbs./hr. | 2.87 |
| Catalyst-(t-butyl persulfate), lbs./1000 lbs. polymer | 0.116 |

A solvent monomer ratio of 0.516 is maintained throughout the reaction. Percent conversion is about 13%.

11

The polymer is then emulsified into a carboxylic polymer latex by a procedure well known in the art. The latex has a polymer solids content of about 40% and is adjusted to a pH of 7 with a 28% aqueous ammonium hydroxide solution.

The carboxylic polymer latex is iminated with about 0.4% by weight, based on the weight of the polymer, propylenimine according to the procedure of Example 1.

A latex paint is formulated from the above latex by using the pigment dispersion of Example 1 and by generally following the formulation used in forming latex paint A of Example 1.

The resulting paint has a pigment volume concentration of about 30%, and a density of about 11.6 pounds per gallon.

The paint has excellent freeze-thaw stability and adheres well to a variety of substrates.

EXAMPLE 8

An iminated latex of a carboxylic polymer of 10:90 methacrylic acid:ethylene is formed by using the general procedure of Example 7.

The resulting latex has a polymer solids content of about 25% and is useful as an adhesive. For example, excellent bond strength is obtained when the latex is used as an adhesive for wood and for polyvinyl fluoride film.

We claim:
1. A pigmented freeze-thaw aqueous paint composition containing a pigment in a pigment volume concentration of about 10–50% and a water insoluble vinyl addition polymer having an overall negative charge which consists essentially of
   (A) about 0.3–5% by weight of units of an $\alpha,\beta$-unsaturated monovinylidene carboxylic acid,
   (B) units of a methacrylic acid ester, and
   (C) units of acrylic acid ester, said esters (B) and (C) being of a $C_1$–$C_8$ saturated aliphatic monohydric primary alcohol,
and having attached to the carbon atoms in the polymer backbone about 0.03–3%, by weight of said vinyl addition polymer, pendent monovalent radicals selected from the group consisting of radical A of the formula

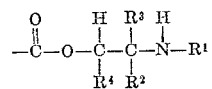

radical B of the formula

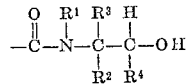

and a mixture of radicals A and B wherein $R^1$ is selected from the group consisting of hydrogen, benzyl and $C_1$–$C_5$ alkyl radicals, $R^2$ and $R^3$ are each selected from the group consisting of hydrogen, benzyl, aryl and $C_1$–$C_5$ alkyl radicals, and $R^4$ is selected from the group consisting of hydrogen and $C_1$–$C_5$ alkyl radicals; said composition having a pH between 7 and 10 and containing 0.3–10% by weight based on the weight of said vinyl addition polymer of at least one non-ionic surfactant.

2. The composition of claim 1 in which the vinyl addition polymer has a pendent monovalent radical content of about 0.1–1% by weight and contains about 1.5–3% by weight of $\alpha,\beta$-unsaturated monovinylidene carboxylic acid units.

3. The composition of claim 1 is which $R^1$, $R^2$, $R^3$ and $R^4$ are hydrogen.

4. The composition of claim 1 in which $R^1$, $R^3$ and $R^4$ are hydrogen and $R^2$ is methyl.

5. The composition of claim 1 in which said esters consist essentially of methyl methacrylate and ethyl acrylate.

6. The composition of claim 1 in which said esters consist essentially of methyl methacrylate and 2-ethylhexyl acrylate.

No references cited.

MURRAY TILLMAN, *Primary Examiner.*

W. J. BRIGGS, Sr., *Assistant Examiner.*

Disclaimer 3,309,331.—*Maurice J. McDowell*, Media, Pa., and *Trevor B. Hill*, Williamsburg, Va. FREEZE-THAW STABLE AQUEOUS PAINTS CONTAINING CARBOXYL, AMINOESTER AND HYDROXYAMIDE RADICALS. Patent dated Mar. 14, 1967. Disclaimer filed Mar. 24, 1970, by the assignee, *E. I. du Pont de Nemours and Company*.

Hereby enters this disclaimer to claims 1, 2, 4, 5 and 6 of said patent.
[*Official Gazette August 18, 1970.*]